(12) United States Patent
Beyer et al.

(10) Patent No.: US 9,970,573 B2
(45) Date of Patent: May 15, 2018

(54) CABLE TIE ASSEMBLY (71) Applicants: Mark Beyer, Armada, MI (US); James Nagle, Rochester, MI (US)

(72) Inventors: Mark Beyer, Armada, MI (US); James Nagle, Rochester, MI (US)

(73) Assignee: A. Raymond Et Cie, Grenoble (FR)

( * ) Notice: Subject to any disclaimer, the term of this patent is extended or adjusted under 35 U.S.C. 154(b) by 0 days. days.

(21) Appl. No.: 15/371,674

(22) Filed: Dec. 7, 2016

(65) Prior Publication Data

US 2017/0159849 A1 Jun. 8, 2017

Related U.S. Application Data (60) Provisional application No. 62/264,637, filed on Dec. 8, 2015.

(51) Int. Cl.
*F16L 3/233* (2006.01)
*B60R 16/02* (2006.01)
*B65D 63/10* (2006.01)
*F16L 3/137* (2006.01)

(52) U.S. Cl.
CPC .......... *F16L 3/233* (2013.01); *B60R 16/0215* (2013.01); *B65D 63/1027* (2013.01); *B65D 2563/108* (2013.01); *F16L 3/137* (2013.01)

(58) Field of Classification Search
CPC . F16L 3/233; F16L 3/137; F16L 3/108; B60R 16/0215; B65D 63/1027; B65D 63/00; B65D 2563/108; F16B 15/00; E04D 3/14; G09F 3/14; H02G 3/30; H02G 3/32; H02G 3/24; Y10T 24/1498

USPC .................. 248/74.3; 24/458, 16 PB, 17 AP; 411/400, 401
See application file for complete search history.

(56) References Cited

U.S. PATENT DOCUMENTS

| 3,090,826 A | | 5/1963 | Cochran | |
|---|---|---|---|---|
| 4,557,455 A | | 12/1985 | Benjamin | |
| 5,065,562 A | * | 11/1991 | Larsen | A01G 9/1469 24/16 PB |
| 5,112,013 A | * | 5/1992 | Tolbert | F16L 3/137 248/74.3 |

(Continued)

FOREIGN PATENT DOCUMENTS

DE 4031237 A1 4/1992
DE 102009038911 A1 3/2011

(Continued)

*Primary Examiner* — Nkeisha Smith
(74) *Attorney, Agent, or Firm* — Dickinson Wright PLLC (57) ABSTRACT A cable tie assembly including a fastener that includes base member. A retention leg extends from the base member for being received by and secured to a bore defined by the support structure. The fastener further includes a first hook that extends from the base member. The cable tie assembly also includes a lock housing that defines a channel that receives the base member of the fastener. The lock housing also includes a strap for being wrapped about the article. The lock housing further includes a second hook for engaging the first hook of the fastener when the lock housing is received by the channel to prevent movement of the fastener relative to the lock housing. The lock housing further includes a cross-member disposed below the second hook for preventing downward movement of the first hook while the first hook is positioned in engagement with the second hook.

19 Claims, 5 Drawing Sheets (56) References Cited

U.S. PATENT DOCUMENTS

| | | | | |
|---|---|---|---|---|
| 5,224,244 | A | * | 7/1993 | Ikeda .................. F16L 3/233 24/16 PB |
| 5,407,160 | A | | 4/1995 | Hollingsworth et al. |
| 5,766,218 | A | * | 6/1998 | Arnott .................. A61B 17/823 24/16 PB |
| 5,921,510 | A | | 7/1999 | Benoit et al. |
| 6,105,908 | A | * | 8/2000 | Kraus .................... F16L 3/137 24/16 PB |
| 6,394,695 | B1 | * | 5/2002 | Chausset ............. B60R 21/216 248/71 |
| 6,550,723 | B2 | * | 4/2003 | Fraley, II ............. F16L 3/233 248/70 |
| 6,715,185 | B2 | * | 4/2004 | Angellotti ............ F16B 5/065 24/297 |
| 7,229,052 | B2 | * | 6/2007 | Takeuchi ............. F16B 21/088 24/16 PB |
| 7,360,744 | B2 | * | 4/2008 | Kwilosz .............. F16L 3/137 248/68.1 |
| 7,404,548 | B2 | * | 7/2008 | Kwilosz ............ B60R 16/0215 248/71 |
| 7,503,528 | B2 | * | 3/2009 | Adams ................ F16B 5/0685 24/297 |
| 7,669,807 | B2 | * | 3/2010 | Stigler .................. B60R 11/00 248/229.16 |
| 7,753,320 | B2 | | 7/2010 | Geiger et al. |
| 7,762,503 | B2 | * | 7/2010 | Franks .................. F16L 3/233 24/16 PB |
| 7,832,693 | B2 | * | 11/2010 | Moerke ................ F16B 21/065 24/16 PB |
| 7,988,105 | B2 | * | 8/2011 | Kamiya .............. F16B 21/088 248/71 |
| 8,221,042 | B2 | * | 7/2012 | Vitali ................... F16B 21/086 411/510 |
| 8,282,047 | B2 | | 10/2012 | Franks |
| 8,313,064 | B2 | * | 11/2012 | Stocker ................ F16L 3/18 248/71 |
| 8,991,774 | B2 | * | 3/2015 | Hajduch .............. B65D 63/00 248/220.22 |
| 9,045,094 | B2 | * | 6/2015 | Schultz .............. B60R 16/0215 |
| D741,691 | S | | 10/2015 | Adams |
| 2005/0242247 | A1 | * | 11/2005 | Geiger ................. F16L 3/2332 248/74.3 |
| 2006/0239796 | A1 | * | 10/2006 | Franks ................ F16B 21/084 411/455 |
| 2007/0057124 | A1 | | 3/2007 | Kwilosz |
| 2007/0126211 | A1 | | 6/2007 | Moerke et al. |
| 2010/0186197 | A1 | * | 7/2010 | Inomata ............. B60R 16/0215 24/16 R |
| 2013/0119208 | A1 | | 5/2013 | Geiger |
| 2014/0131528 | A1 | | 5/2014 | Blakeley et al. |

FOREIGN PATENT DOCUMENTS

| | | |
|---|---|---|
| FR | 1034679 | 6/1966 |
| GB | 2244087 A | 11/1991 |

\* cited by examiner

CABLE TIE ASSEMBLY

CROSS-REFERENCE TO PRIOR APPLICATIONS

This U.S. Patent Application claims the benefit of U.S. Provisional Patent Application Ser. No. 62/264,637 filed Dec. 8, 2015, entitled "Cable Tie Assembly," the entire disclosure of the application being considered part of the disclosure of this application and hereby incorporated by reference.

BACKGROUND OF THE INVENTION

1. Field of the Invention

A cable tie assembly for anchoring one or more articles to a support structure.

2. Description of the Prior Art

Cable tie assemblies are utilized in various industries, including the automotive industry, for anchoring one or more articles to a support structure. The articles may include, for example, bundled wires, cables, hoses, etc., and the support structure may include, for example, a panel of a vehicle. In certain applications, such as when cable tie assemblies are used to hold articles to panels of automobiles, the articles may be subjected to severe jostling and vibrations. As such, it is desirable for the cable tie assembly to provide an efficient and tight grip on the article, even during movement thereof.

Figure 1:
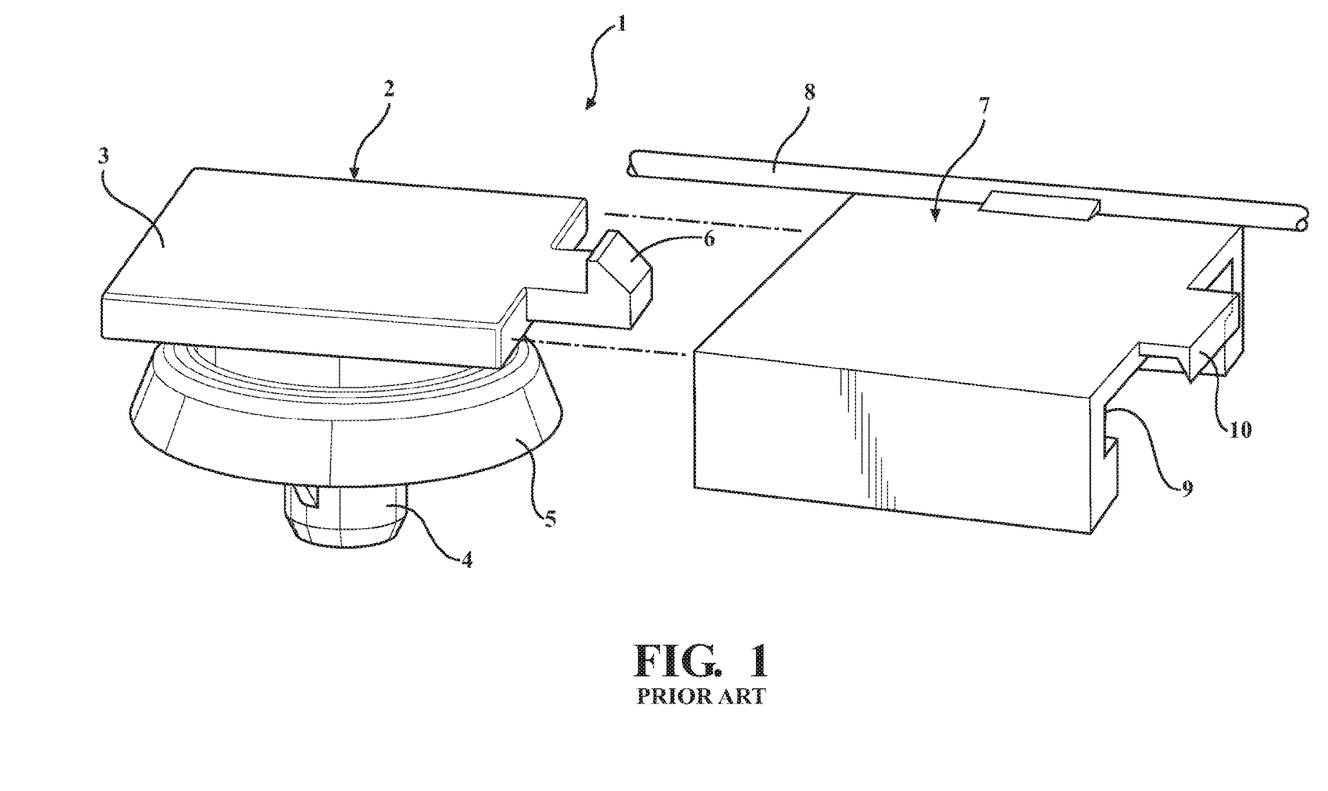
FIG. 1 is a perspective, exploded view of a conventional cable tie assembly.

FIG. 1 presents an example of a conventional cable tie assembly 1. The cable tie assembly 1 includes a fastener 2 for being fixed to the support structure. More specifically, the fastener 2 includes a base member 3 and a retention member 4 that extends from the base member 3 for being fixedly received by a bore on the support structure. A spring 5 is disposed about the retention member 4 for applying a stabilizing retentive force against the support structure after the retention member 4 has been inserted into the bore of the support structure. The fastener 2 also includes a first hook 6 that extends away from the base member. The tie assembly 1 further includes a lock housing 7 that is detachably connected to the fastener 2. A connector 8 (e.g., a strap) is fixed to the lock housing 7 for being secured to one or more articles to secure the articles to the tie assembly 1. The lock housing 7 defines a channel 9 that removeably receives the base member 3 of the fastener 2. The lock housing 5 also includes a second hook 10 for being engaged by the first hook 4 to aid in securing the fastener 2 to the lock housing 5 when the fastener 2 is received by the channel 9 of the lock housing 5.

During the application of external forces on the tie assembly 1, it has been recognized that the first hook 6 of the fastener 2 and the second hook 10 of the lock housing 7 may become disconnected from one another, thus jeopardizing the overall connection between the fastener 2 and the lock housing 7 (and between the article and support structure). As such, there remains a need for improvements to such tie assemblies to more reliably secure articles to support structures.

SUMMARY OF THE INVENTION

According to an aspect of the disclosure, a cable tie assembly is provided for anchoring an article to a support structure. The cable tie assembly includes a fastener for being secured to the support member. The fastener includes a base member and a retention leg extending from the base member for being received by and secured to a bore defined by the support structure for inhibiting movement of the fastener relative to the support structure. The fastener further includes a first hook extending from the base member. A lock housing defines a channel for removeably receiving the base member of the fastener. The lock housing has a strap for being wrapped about the article to secure the article to the lock housing. The lock housing further includes a second hook for engaging the first hook when the lock housing is received by the channel to secure the fastener to the lock housing. The lock housing further includes a cross-member positioned adjacent to and spaced from the second hook such that the first hook is positioned between the second hook and the cross-member while the fastener is received by the channel of the lock housing to prevent the first hook from moving relative to the second hook to prevent the first and second hooks from being disconnected from one another during the application of external forces to the cable tie assembly.

According to another aspect of the disclosure a further cable tie assembly is provided for anchoring an article to a support structure. The cable tie assembly includes a fastener for being secured to the support member. The fastener has a base member and a retention leg extending from the base member for being received by and secured to a bore defined by the support structure for inhibiting movement of the fastener relative to the support structure. The fastener further includes a first hook connected to the base member. A lock housing is provided that has a receiving platform and a pair of overhangs extending transversely from the receiving platform to define a channel removeably receiving the base member of the fastener. The lock housing further includes an elongated strap for being wrapped about the article to secure the article to the lock housing. The lock housing also includes a second hook flexibly connected to the receiving platform and engaging the first hook to secure the fastener to the lock housing. The lock housing further includes a cross-member extending between the overhangs and disposed adjacent to and spaced from the second hook. The first hook is positioned between the second hook and the cross-member such that the first hook is inhibited from flexing away from the second hook by the cross-member to prevent the first and second hooks from being disconnected from one another during the application of external forces to the cable tie assembly.

The invention in its broadest aspect therefore ensures that the article and support structure remain connected to one another, even during the application of external forces to the cable tie assembly. More specifically, during the application of a downward force against the first hook, the cross-member inhibits, or at least substantially prevents, movement of the first hook relative to the second hook in the downward direction, thus ensuring that the first and second hooks remain connected to one another, thereby also ensuring that the article and support structure remain connected to one another. This is particularly advantageous when the subject cable tie assembly is utilized in vehicle applications because it prevents external forces that may result from jostling or vibrations from disconnecting the first and second hooks from one another.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the FIGS. 2-6, wherein like numerals indicate corresponding parts throughout the several views, a cable tie assembly 20 is generally shown for anchoring at least one article to a support structure. It should be appreciated that the article may include various types of articles including, but not limited to, bundled wires, cables and hoses. Further, the supporting structure may include various supporting structures including, but not limited to, a panel of an automobile.

Figure 2:
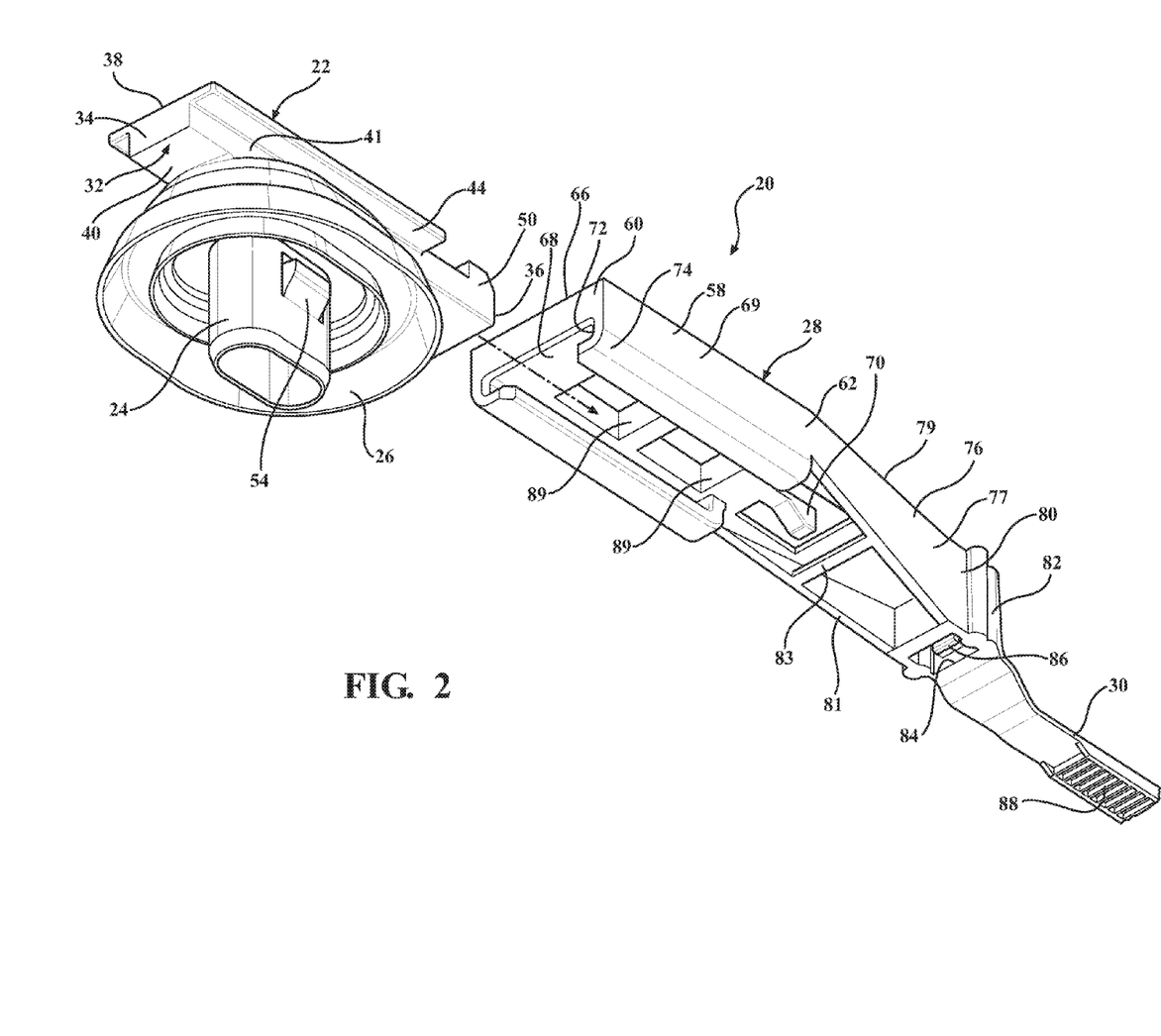
FIG. 2 is a perspective, exploded view of an example embodiment of a cable tie assembly according to an aspect of the disclosure.
Figure 3:
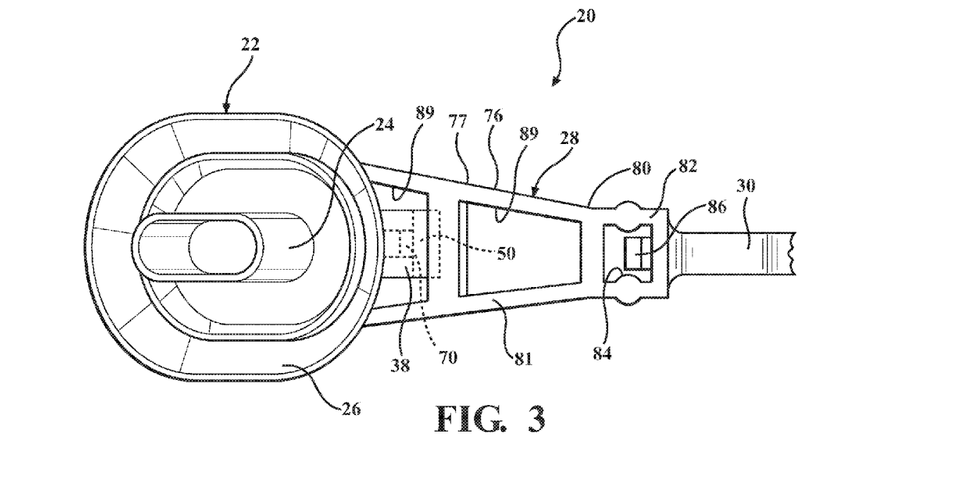
FIG. 3 is a top, perspective view of the example embodiment of the cable tie assembly.
Figure 4:
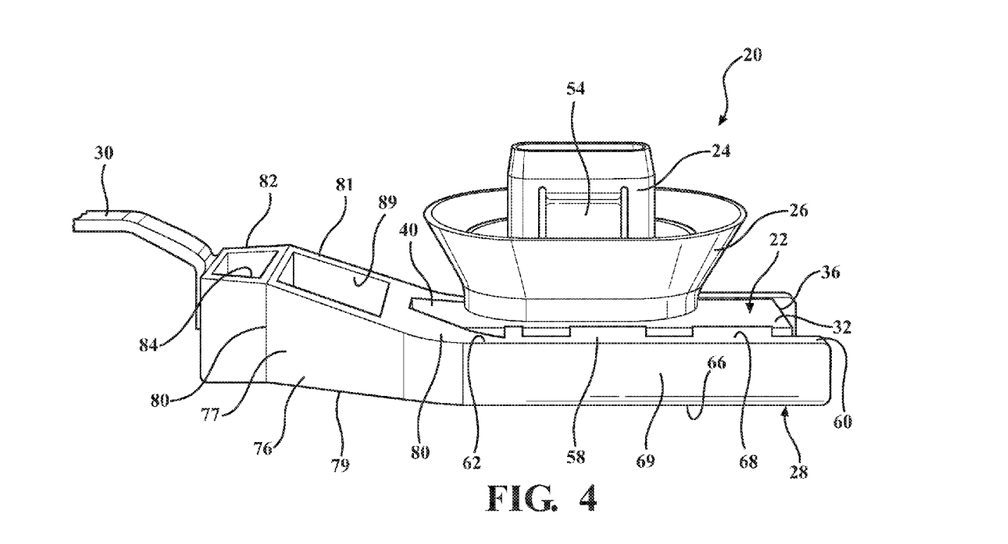
FIG. 4 is a side, perspective view of the example embodiment of the cable tie assembly.

As best illustrated in FIG. 2, the cable tie assembly 20 generally includes a fastener 22 for being fixed to the support member. More specifically, the fastener 22 includes a retention leg 24 for being fixedly received by a bore of the support member. A spring member 26 is disposed about the retention leg 24 for provide a stabilizing retentive force against the support structure after the retention leg 24 is received by the bore of the support structure. The cable tie assembly 20 also includes a lock housing 28 that has an elongated strap 30 for being wrapped about the article to secure the article to the lock housing 28. The fastener 22 is detachably connected to the lock housing 28, thus allowing the article to be connected and disconnected to the support member by connecting and disconnecting the fastener 22 from the lock housing 28.

Figure 5:
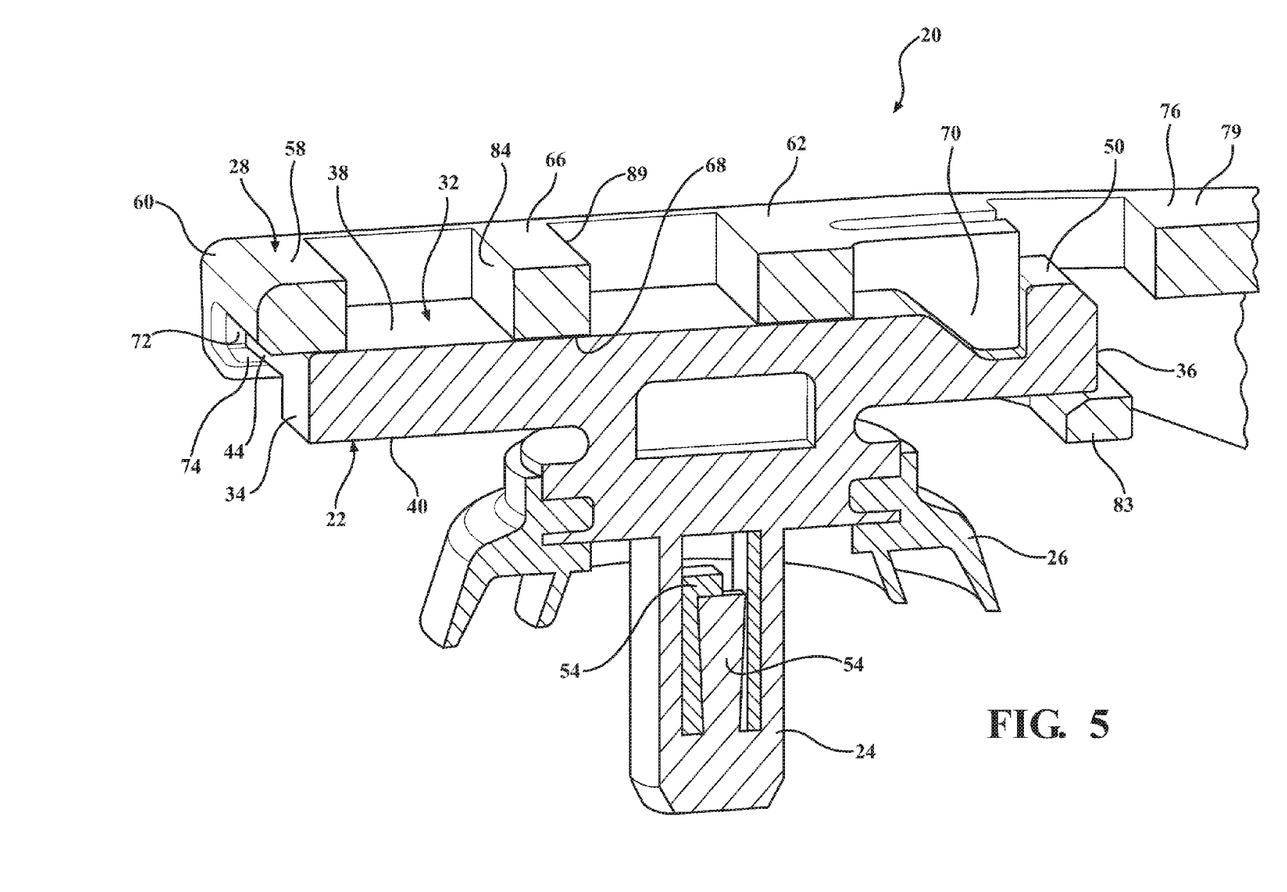
FIG. 5 is a side cutaway view of the example embodiment of the cable tie assembly illustrating a fastener received by a channel of a lock housing.
Figure 6:
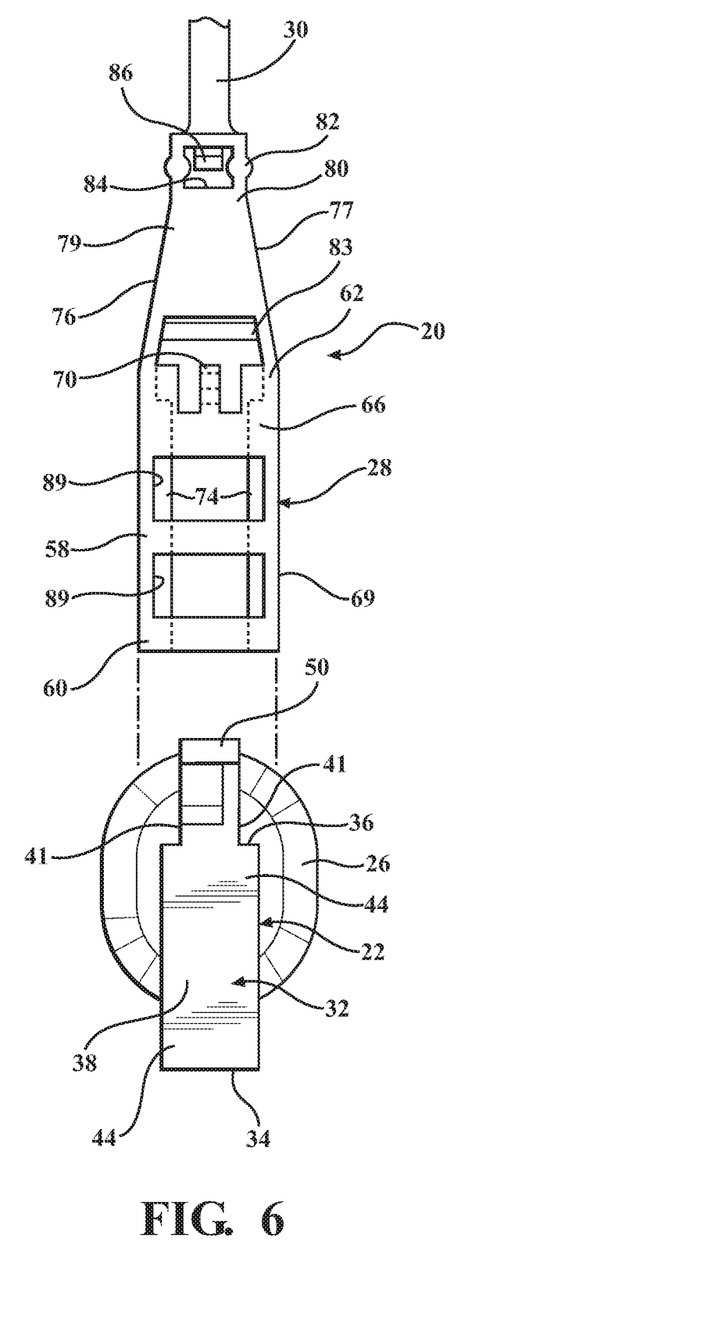
FIG. 6 is a top, exploded view of the example embodiment of the cable tie assembly.

As best illustrated in FIGS. 2, 5 and 6, the fastener 22 includes a generally block-shaped base member 32 that extends between a first end 34 and a second end 36. The base member 32 also has an upper surface 38 and lower surface 40 that extend between a pair of side walls 41 in spaced and parallel relationship with one another. A pair of retaining wings 44 each extend outwardly from one of the side walls 41 of the base member 32 at the upper surface 38. It should be appreciated that the base member 32 could have other shapes. A first hook 50 extends from the second end 36 of the base member 32.

As best illustrated in FIG. 2, the retention leg 24 extends from the lower surface 40 of the base member 32 in transverse relationship with the lower surface 40 and terminates at an extremity. The retention leg 24 tapers inwardly at its extremity for guiding the retention leg 24 into the bore of the support structure. The retention leg 24 further defines a hollow therein. The retention leg 24 has an oval shaped cross-section in the example embodiment, however, it should be appreciated that it could have other shapes including, but not limited to, a cylindrical shape.

A pair of retention fingers 54 flexibly extend from the retention leg 24. Each of the retention finger 54 taper outwardly for flexing into the hollow while engaging the support structure during insertion of the retention leg 24 into the bore of the support structure, and for engaging the support structure after the retention leg 24 has been inserted into the bore for inhibiting movement of the fastener 22 away from the support structure. Said another way, the retention fingers 54 provide a "snap-fit" that allows the retention leg 24 to be inserted into the bore of the support structure, but prevents removal of the retention leg 24 from the bore of the support structure once inserted therein. It should be appreciated that any number of retention fingers 54 may be utilized.

The spring member 26 is connected to and disposed about the retention leg 24. The spring member 26 has a generally bell shape and tapers outwardly to a terminal end. The spring member 26 is made of an elastic material such as, but not limited to, a rubber. The elastic nature of the spring member 26 allows it to flex upon the application of a suitable force, thus after the retention leg 24 has been inserted into the bore of the support structure, the spring member 26 provides a stabilizing retentive force on the underside of the supporting structure into which the retention leg 24 is inserted. It should be appreciated that other types of biasing devices could be utilized as the spring member 26.

The lock housing 28 has a perimeter wall 69. The lock housing 28 also includes a receiving platform 58 that generally has a box shape and extends between a first area 60 and a second area 62. The lock housing 28 also has an upper face 66 and a lower face 68 that extend between the perimeter wall 69. A pair of generally L-shaped overhangs 74 each extend downwardly from the perimeter wall 69 in spaced and parallel relationship with one another. Together, the overhangs 74 and lower face 68 of the lock housing 28 define a channel 72 for receiving the retaining wings 44 of the fastener 22. More specifically, the base member 32 may be inserted into the channel 72 at the first area 60 with the upper surface 38 of the fastener 22 disposed against the lower face 68 of the lock housing 28 and with the retaining wings 44 of the fastener 22 supported by the overhangs 74.

A second hook 70 flexibly extends from second area 62 of the receiving plate 58 for being connected to the first hook 50 when the fastener 22 is received by the channel 72 of the lock housing 28 to fixedly connect the fastener 22 and the lock housing 28 to one another when the base member 32 of the fastener 22 is inserted into the channel 72 of the lock housing 28. The perimeter wall 69 of the lock housing 28 surrounds the second hook 70, thereby protecting it.

A spacer 76 extends from the second area 62 of the receiving platform 58 of the lock housing 28 and terminates at a terminal region 80. In the example embodiment, the spacer 76 has a generally trapezium shape, however, it should be appreciated that it could have other shapes. The spacer 76 includes a pair of sidewalls 77 that have an upper periphery 79 that is aligned with the upper face 66 of the receiving platform 58 and a lower periphery 81 spaced from the upper periphery 79. The lower periphery 81 of each of the sidewalls 77 tapers away from the upper periphery 79 between the receiving platform 58 and the terminal region 80.

A locking head 82 is connected to the terminal region 80 of the spacer 76. The locking head 82 defines a passage 84 that extends therethrough. A pawl 86 is flexibly connected to the locking head 82 in the passage 84. The elongated strap 30 extends away from the locking head 82 for being wrapped about the article and through the passage 84 to secure the article to the cable tie assembly 20. The strap 30 presents a plurality of teeth 88 for being engaged by the pawl 86 during insertion of the strap 30 into the passage 84 for inhibiting movement of the strap 30 out of the passage 84 after it is inserted therein.

The spacer 76 surrounds the connection between the first and second hooks 50, 70 when the fastener 22 is received by the channel 72 of the lock housing 28, thus reinforcing and protecting the connection between the first and second hooks 50, 70. Additionally, because of the placement of the spacer 76 between the receiving platform 58 and the locking head 82, the spacer 76 effectively spaces the retention leg 24 and spring member 26 from the locking head 82 and strap 30, thereby providing space for a user to position and remove the fastener 22 on the supporting structure without interference from the strap 30. It should be appreciated that the spacer 76 could have other shaped such as, but not limited to, a rectangular shape.

As best as best illustrated in FIGS. 2 and 5, a cross-member 83 extends between the overhangs 74 adjacent to the second area 62 of the receiving platform 58. The cross-member 83 is downwardly and horizontally spaced from the second hook 70 such that it is disposed adjacent to the bottom side 83 of the first hook 50 once the first hook 50 is positioned into engagement with the second hook 70. During the application of a downward force against the first hook 50, the cross-member 83 inhibits, or at least substantially prevents, movement of the first hook 50 relative to the second hook 70 in the downward direction, thus ensuring that the first and second hooks 50, 70 remain connected to one another, thereby also ensuring that the article and support structure remain connected to one another. This is particularly advantageous when the subject cable tie assembly 20 is utilized in vehicle applications because it prevents external forces that may result from jostling or vibrations from disconnecting the first and second hooks 50, 70. It should be appreciated that the cross-member 83 also inhibits flexing of the first hook 50 during insertion of the first hook 50 between the second hook 70 and the cross-member 83, thus during insertion of the first hook 50, the second hook 70 may flex upwardly to provide space for the first hook 50.

The cross-member 83 has a generally square-shaped cross section aside from a slanted corner, which assists in guiding the first hook 50 into position. It should be appreciated that the cross-member 83 could be disposed at other locations along the sidewalls 78 and could have other shapes based on the sizes and shapes of the first and second hooks 50, 70 that are utilized.

The receiving platform 58 and spacer 76 may define a plurality of slots 89 therein for reducing the amount of material used on the lock housing 28 and to reduce the weight of the lock housing 28. It should be appreciated that the slots 89 could have various shapes and sizes.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A cable tie assembly for anchoring an article to a support structure, said cable tie assembly including:

a fastener for being secured to the support structure, said fastener including a base member and a retention leg extending from the base member for being received by and secured to a bore defined by the support structure for inhibiting movement of said fastener relative to the support structure;

said fastener further including a first hook extending from said base member;

a lock housing defining a channel for removeably receiving said base member of said fastener, and having an elongated strap for being wrapped about the article to secure the article to said lock housing;

said lock housing further including a second hook for engaging said first hook when said base member is received by said channel to secure said fastener to said lock housing; and said lock housing further including a cross-member positioned adjacent to and spaced from said second hook such that said first hook is positioned between said second hook and said cross-member while said base member is received by said channel of said lock housing to prevent said first hook from moving relative to said second hook to prevent said first and second hooks from being disconnected from one another during an application of external forces to said cable tie assembly;

wherein said lock housing has a receiving platform and a pair of overhangs extending transversely to said receiving platform in spaced relationship with one another to define said channel therebetween, and wherein said cross-member is spaced from said channel.

2. A cable tie assembly as set forth in claim 1 wherein said base member of said fastener has an upper surface and a lower surface positioned opposite from one another, and wherein said upper surface engages said receiving platform of said lock housing when said fastener is received in said channel of said lock housing.

3. A cable tie assembly as set forth in claim 2 wherein said retention leg extends from said lower surface of said base member in spaced relationship with said first hook.

4. A cable tie assembly as set forth in claim 1 wherein said overhangs are disposed in spaced and parallel relationship with one another; and wherein said cross-member extends in perpendicular relationship with said overhangs.

5. A cable tie assembly as set forth in claim 1 wherein said second hook is flexibly connected to said receiving platform and moveable away from said first hook and said cross-member to allow said first and second hooks to be positioned in engagement with one another when said fastener is inserted into said channel of said housing.

6. A cable tie assembly as set forth in claim 1 wherein said receiving platform of said lock housing extends between a first area and a second area, wherein said second hook extends from said second area of said receiving platform; and wherein said lock housing further includes a spacer extending from said second area of said receiving platform about said second hook and terminating at a terminal region being spaced from said second hook.

7. A cable tie assembly as set forth in claim 6 wherein a locking head is connected to said terminal region of said spacer and defines a passage; and said elongated strap extends from said locking head for being wrapped about the article and through said passage to secure the article to said cable tie assembly.

8. A cable tie assembly as set forth in claim 7 wherein said receiving platform has an upper face and a lower face disposed opposite from one another; and said spacer has an upper periphery being aligned with said upper face of said receiving platform and said spacer has a lower periphery tapering away from said upper periphery between said receiving platform and said terminal region.

9. A cable tie assembly as set forth in claim 1 further including a spring member disposed about said retention leg to provide a stabilizing retentive force against the support structure while said retention leg is received by the bore of the support structure.

10. A cable tie assembly as set forth in claim 1 wherein said lock housing defines a perimeter wall, and wherein said perimeter wall is disposed about said second hook.

11. A cable tie assembly for anchoring an article to a support structure, said cable tie assembly including:
a fastener for being secured to the support structure, said fastener including a base member and a retention leg extending from said base member for being received by and secured to a bore defined by the support structure for inhibiting movement of said fastener relative to the support structure;
said fastener further including a first hook connected to said base member;
a lock housing having a receiving platform and a pair of overhangs extending transversely from said receiving platform to define a channel removeably receiving said base member of said fastener;
said lock housing further including an elongated strap for being wrapped about the article to secure the article to said lock housing;
said lock housing further including a second hook flexibly connected to said receiving platform and engaging said first hook to secure said fastener to said lock housing; and
said lock housing further including a cross-member longitudinally aligned with said channel and disposed adjacent to and spaced from said second hook, and wherein said first hook is positioned between said second hook and said cross-member such that said first hook is inhibited from flexing away from said second hook by said cross-member to prevent said first and second hooks from being disconnected from one another during an application of external forces to said cable tie assembly.

12. A cable tie assembly as set forth in claim 11 wherein said base member of said fastener has an upper surface and a lower surface opposite from one another, and wherein said upper surface engages said receiving platform of said lock housing.

13. A cable tie assembly as set forth in claim 12 wherein said retention leg extends from said lower surface of said base member in spaced relationship with said first hook.

14. A cable tie assembly as set forth in claim 11 wherein said overhangs are disposed in spaced and parallel relationship with one another; and wherein said cross-member extends in perpendicular relationship with said overhangs.

15. A cable tie assembly as set forth in claim 11 wherein said second hook is moveable in an upward direction away from said first hook and said cross-member to allow said first and second hooks to be positioned in engagement with one another when said fastener is inserted into said channel of said lock housing.

16. A cable tie assembly as set forth in claim 11 wherein said lock housing defines a perimeter wall, and wherein said perimeter wall of said lock housing is disposed about said second hook.

17. A cable tie assembly as set forth in claim 11 wherein said receiving platform extends between a first area and a second area, wherein said second hook extends from said second area of said receiving platform; and wherein said lock housing further includes a spacer extending from said second area of said receiving platform about said second hook and terminating at a terminal region being spaced from said second hook.

18. A cable tie assembly as set forth in claim 17 wherein a locking head is connected to said terminal region of said spacer and defines a passage; and said elongated strap extends from said locking head for being wrapped about the article and through said passage to secure the article to said cable tie assembly.

19. A cable tie assembly as set forth in claim 18 wherein said receiving platform has an upper face and a lower face disposed on opposing sides from one another; said spacer has an upper periphery being aligned with said upper face of said receiving platform and said spacer has a lower periphery tapering away from said upper periphery between said receiving platform and said terminal region.

* * * * *